US012608611B2

(12) United States Patent
Sharpe et al.

(10) Patent No.: US 12,608,611 B2
(45) Date of Patent: Apr. 21, 2026

(54) MULTISCALE DIMENSIONAL REDUCTION OF DATA

(71) Applicant: Capital One Services, LLC, McLean, VA (US)

(72) Inventors: Samuel Sharpe, Somerville, MA (US); Dwipam Katariya, Ashburn, VA (US); Nima Chitsazan, Tenafly, NJ (US); Qianyu Cheng, Englewood Cliffs, NJ (US); Karthik Rajasethupathy, Hoboken, NJ (US)

(73) Assignee: Capital One Services, LLC, McLean, VA (US)

( * ) Notice: Subject to any disclaimer, the term of this patent is extended or adjusted under 35 U.S.C. 154(b) by 1087 days.

(21) Appl. No.: 17/539,971

(22) Filed: Dec. 1, 2021

(65) Prior Publication Data

US 2023/0169345 A1 Jun. 1, 2023

(51) Int. Cl.
*G06N 3/082* (2023.01)
*G06N 3/045* (2023.01)
*G06N 3/063* (2023.01)

(52) U.S. Cl.
CPC ............. *G06N 3/082* (2013.01); *G06N 3/045* (2023.01); *G06N 3/063* (2013.01)

(58) Field of Classification Search
CPC ......... G06N 3/082; G06N 3/045; G06N 3/063
See application file for complete search history.

(56) References Cited

U.S. PATENT DOCUMENTS

2018/0300609 A1* 10/2018 Krishnamurthy ...... G06N 3/044
2020/0401661 A1* 12/2020 Kota ...................... G06N 20/00

OTHER PUBLICATIONS

Python Datetime Tutorial: Manipulate Times, Dates, and Time Spans, Dataquest, Oct. 31, 2019 (Year: 2019).*
Kaleko, Feature Engineering—Handling Cyclical Features, Oct. 30, 2017 (Year: 2017).*
Hansen et al., Contextual and Sequential User Embeddings for Large-Scale Music Recommendation, Sep. 2020 (Year: 2020 ).*
Zhu et al., What to Do Next: Modeling User Behaviors by Time-LSTM (Year: 2017).*
Quadrana et al., Personalizing Session-based Recommendations with Hierarchical Recurrent Neural Networks, Aug. 2017 (Year: 2017).*

* cited by examiner

*Primary Examiner* — Tamara T Kyle
*Assistant Examiner* — Jacqueline C. Meyer
(74) *Attorney, Agent, or Firm* — Foley & Lardner LLP

(57) ABSTRACT

A method includes segmenting updates associated with a record into a set of update subsets and generating first and second vectors based on first and second update subsets using a first neural network. The first update subset is associated with a first session and a timestamp, and the second update subset is associated with a second session. The method includes determining a first output using a second neural network based on the first and second vectors and a time difference between the first and second sessions. The method includes selecting a segment of a periodic time interval based on the timestamp, determining a second output using a third neural network based on a ratio based on the segment and the periodic time interval, and generating a characterizing vector using a fourth neural network based on the first and second outputs.

20 Claims, 4 Drawing Sheets

200

400

MULTISCALE DIMENSIONAL REDUCTION OF DATA

BACKGROUND

Data may be obtained from users based on their interactions with an interface and stored in a set of databases that are accessible to other applications for further analysis and activity. Data obtained from applications may be used for various types of applications in an enterprise-scale system. Such applications include predicting future behavior, detecting new types of behavior, and detecting possible occurrences of fraud or malicious activity.

SUMMARY

In the context of predictive operations, data obtained from user interactions over a set of digital sessions may be used to predict future user interactions. Such interactions may include the selection or manipulation of user interface elements to perform one or more updates to a record in a database. The increase of high bandwidth technology and the increasing robustness of user interface (UI) event detection have enabled client computer devices to communicate an increasing number of events to a server. To compensate for this, applications may attempt to dimensionally reduce the amount of data. However, enterprise-scale services may often require different types of predictions, where some predictions are for events that occur on different timescales.

To account for these additional complexities, some embodiments may apply a multi-scale approach to dimensionally reduce the data and allow different applications or different components of an application to predict different events across different timescales. A computer system may obtain a set of updates to a record provided by a user across different digital sessions, where the user is logged in to the user account during the digital sessions. Some embodiments may segment the set of updates based on their respective digital sessions, where each update subset is associated with a different digital session. Some embodiments may then generate a vector for each digital session based on the update subset associated with the digital session using a first component of a machine learning model. Some embodiments may then use other components of the machine learning model associated with different durations that then may be used to determine intermediate outputs corresponding with the other components of the machine learning model. Some embodiments may then use another component of the machine learning model to combine the intermediate outputs and generate a record-characterizing vector based on the set of intermediate outputs. These record-characterizing vectors may be used to predict future user behavior across timescales associated with the different durations.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and in the claims, the term "or" means "and/or" unless the context clearly dictates otherwise. Additionally, as used in the specification, "a portion" refers to a part of, or the entirety of (i.e., the entire portion), a given item (e.g., data)

unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
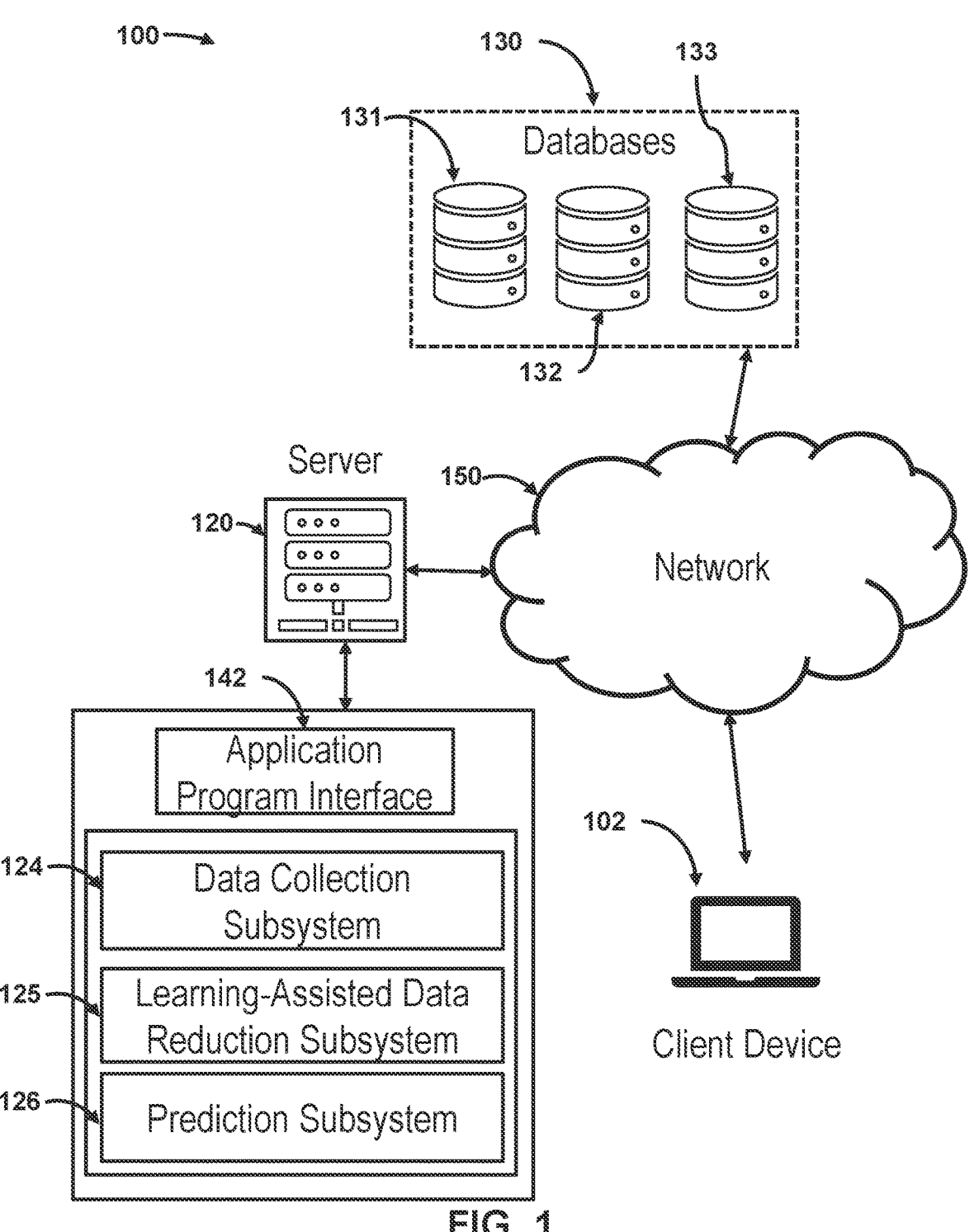
FIG. 1 shows an illustrative system for obtaining updates and dimensionally reducing update data, in accordance with one or more embodiments.

FIG. 1 shows an illustrative system for obtaining updates and dimensionally reducing update data, in accordance with one or more embodiments. A system 100 includes a client computer device 102. While shown as a laptop computer, it should be noted that the client computer device 102 may include other types of computer devices such as a desktop computer, a wearable headset, a smartwatch, another type of mobile computing device, etc. In some embodiments, the client computer device 102 may communicate with various other computer devices via a network 150, where the network 150 may include the Internet, a local area network, a peer-to-peer network, etc.

The client computer device 102 may send and receive messages through the network 150 to communicate with a server 120, where the server 120 may include non-transitory storage medium storing program instructions to perform one or more operations of subsystems 124-126. It should further be noted that, while one or more operations are described herein as being performed by particular components of the system 100, those operations may be performed by other components of the system 100 in some embodiments. For example, one or more operations described in this disclosure as being performed by the server 120 may instead be performed by the client computer device 102. Furthermore, although some embodiments are described herein with respect to a first type of machine learning model, other machine learning models or other prediction models (e.g., a statistical model) may be used instead of or in addition to the first type of machine learning model. For example, a transformer neural network model may be used to replace a long short-term memory (LSTM) model in one or more embodiments.

In some embodiments, the set of computer systems and subsystems illustrated in FIG. 1 may include one or more computer devices having or otherwise capable of accessing electronic storage, such as the set of databases 130. The set of databases 130 may store updates to user input records, updates to database transaction records, updates to financial records, etc. The set of databases 130 may include relational databases (e.g., Microsoft SQL, Amazon RDS™, Oracle database, etc.), graph databases (e.g., Amazon Neptune™ database, Neo4j™, Dgraph™, etc.), or another type database. Some embodiments may also obtain records of datasets or other data not stored in the set of databases 130 by using an application programming interface (API) of a third-party data service via the network 150.

In some embodiments, different databases of the set of databases may include different types of data. For example, a first database 131 may store user input data, such as the locations and timepoints of user clicks or taps on a screen, the names of user interface elements that were highlighted by the user, text entered into text boxes by the user, a category selected by a user via a drop-down menu or radio dial button, etc. Alternatively, or in addition, a second database 132 of the set of databases 130 may store records of dimensionally reduced output values generated using one or more operations described in this disclosure, where the dimensionally reduced output values include a vector, where the vector is associated with a user record, or another type of record. As described elsewhere in this disclosure, the set of values may be used to generate predictions for different timescales and for different types of predictions. In addition, a third database 133 of the set of databases may be used to store learning model parameters, such as the weights, biases, activation function parameters, etc., of a neural network model.

In some embodiments, the client computer device 102 may send messages to the server 120, the set of databases 130, or other computer devices via the network 150. The message may include a web request or a web response conforming to an established communication protocol (e.g., Hypertext Transfer Protocol (HTTP), HTTP Secure (HTTPS), etc.). For example, the client computer device 102 may initiate a digital session with the server 120. During the digital session, the client computer device may interact with a set of UI elements, transfer an account value from a first account to a second account, and log out. Indicators of some or all of the interactions or effects of the interaction may be sent during the digital session to update one or more records. For example, the server 120 may receive indicators of user events via an event stream being written by the client computer device 102. Some embodiments may then perform one or more operations described in this disclosure to generate a prediction or other output based on the data and update or otherwise modify the operations of the client computer device 102 based on the prediction.

In some embodiments, the system 100 may be part of a cloud system implemented on a distributed computer system that includes the server 120, where the cloud system may include any computing device described in this disclosure or any other type of mobile computer device, fixed computer device, or other computer device. In some embodiments, the distributed computer system may include a set of computing nodes such as a set of servers that includes the server 120 or remote computing devices. The cloud system may include a set of programs or computing services being executed by the distributed computer system. In some embodiments, the cloud system may perform processing or data storage operations similar to or the same as those described elsewhere in this disclosure. For example, the cloud system may perform a set of operations performed by the client computer device 102, the server 120, the network 150, or the set of databases 130, such as collecting user input data and determining record-characterizing vectors based on the user input data.

Some embodiments may train and use a neural network or another machine learning model (e.g., random forest, naïve Bayes model, etc.) to determine one or more values. In some embodiments, an input dataset for the machine learning model may include a set of inputs corresponding with events caused by the user or actions performed by the user. In some embodiments, the machine learning model may include a neural network, where the neural network includes an input layer and one or more hidden layers. Each neural network cell of the neural network may be connected with one or more other neural network cells, where the arrangement of the connections may impact the efficiency and accuracy of predictions based on an output of the neural network. Such connections can be enforcing or inhibitory in their effect on the activation state of connected neural network cells. In some embodiments, each individual neural network cell may have a summation function that combines the values of all of its inputs. In some embodiments, each connection (or the neural network cell itself) may have a threshold function such that the signal must surpass it before it propagates to other neural network cells.

In some embodiments, a machine learning model may update its configurations (e.g., by updating weights, biases, or other learning model parameters) based on the outputs and reference feedback information during a training operation. In some embodiments, a neural network may include multiple layers (e.g., where a signal path traverses from front layers to back layers) and may be trained with the use of backpropagation techniques, where forward stimulation is used to reset weights on the "front" neural network cells. For example, one or more neural network cells of a neural network may require that their respective errors are sent backward through the neural network to facilitate the update process (e.g., backpropagation of errors). For example, an output layer of the machine learning model may output a predicted record-characterizing vector for a first digital session based on a first record-characterizing vector, where the first record-characterizing vector was determined for a prior digital session that occurred prior to the first digital session. Some embodiments may then determine an actual record-characterizing vector based on data obtained during the first digital session, where the difference between the predicted and actual vectors may be used to determine the error values by which one or more weights, biases, or other learning model parameters are updated via backpropagation.

Subsystems 124-126

In some embodiments, the data collection subsystem 124 may receive user inputs recorded as a set of events, changes to database records, or changes to other types of values stored in a data set. Some embodiments may obtain session connection data, such as session connection timepoints, from the client computer device 102 and store user input data or other data in association with a record identified by the digital session. For example, some embodiments may establish a digital session between the server 120 and the client computer device 102, where the user is logged in to the client computer device 102. Some embodiments may then receive a set of user inputs from the client computer device 102 at the server 120 during the digital session, where the set of user inputs causes one or more records associated with the user to update. The records being updated may be associated with the user and may have been identified based on identifiers used by the user to log in to start the digital session. For example, some embodiments may collect clickstream data after a user logs in to a webpage or mobile platform. The clickstream data may include information such as page use, actions, or other clickstream events. Each clickstream event may represent an update, correspond with an update, or otherwise be associated with an update.

In some embodiments, the data collection subsystem 124 may obtain user inputs in the form of biometric information, such as facial recognition, fingerprint recognition, gaze tracking, etc. For example, an input of the data collection subsystem may include an indication that a user's gaze traveled from a first portion of a screen to a second portion of a screen, an indication of an amount of time that a user gazed upon a specific UI element, or another indication of other gaze-related information. As described elsewhere, some embodiments may predict user updates to account records or other types of database transactions based on biometric data, where recurring patterns indicated by biometric data may be used to indicate suspicious activity or otherwise unconventional activity.

In some embodiments, the data collection subsystem 124 may collect data or store a data sequence of event codes. For example, after a user logs in to their account on the client computer device 102, some embodiments may pre-process event data and other data based on a dictionary or function to encode user-caused updates caused by user activity across multiple applications. For example, a user may use a first application by interacting with a static hyperlink of the first application to cause a first update to a record, and the user may use a second application by interacting with an interactive animation to cause a second update to the record. Some embodiments may then use a function or service to standardize the interactions, such that at least a portion of the record of both events include the same coding value, where the coding value may be a string, such as "record update."

In some embodiments, the data collection subsystem 124 may collect other data associated with a user identified or otherwise associated with the digital session. The other data may include context values associated with the user, where context values may be or include categories assigned to the user or otherwise associated with the user, values collected from records associated with the user, etc. For example, some embodiments may collect a total account value, a change in a quantitative value, a number of database transactions, and other values stored in the account record. Some embodiments may collect data associated with a current digital session. Alternatively, or in addition, some embodiments may collect data associated with previous digital sessions. For example, some embodiments may use a daily amount stored in a user record for each day as a context value. Some embodiments may then use the context value of each day in conjunction with user-caused updates to a record as an input for a set of neural network cells to determine an output of the set of neural network cells, where the output may then be used to determine a user-characterizing vector or another type of user-characterizing set of values. Some embodiments may collect combined data associated with a digital session or with a user identified during the digital session, where the collected combined data may be described as a snapshot.

In some embodiments, the learning-assisted data reduction subsystem 125 may be used to determine a record-characterizing vector or other set of values to characterize a record. The learning-assisted data reduction subsystem 125 may access one or more records of updates representing user events or user-caused actions and group each of the updates collected into bins corresponding with the digital sessions in which the updates occurred. For example, some embodiments may collect a set of clickstream events and separate a portion of the set into a first subset of updates, where each update of the first subset of updates is caused by clickstream events that occurred during a first digital session. Some embodiments may then separate another portion of the set consisting of the remaining clickstream events into a second subset of updates, where each update of the second subset of updates includes clickstream events that occurred during a second digital session. As described in this disclosure, a subset of updates may include a list, an array, or another data structure that includes identifiers of the updates. For example, a set of updates may include the sequence of identifiers {"login"; "nav_page: https:exlk1059320"; "interact_333"; "yes"; "logout"}.

In some embodiments, the learning-assisted data reduction subsystem 125 may use an autoencoder or another sequence-to-sequence neural network to determine a set of representative vectors for each of the digital sessions. For example, the learning-assisted data reduction subsystem 125 may use an LSTM autoencoder by providing the LSTM autoencoder with a subset of updates to output a vector that represents an embedding of the digital session associated with the subset of updates.

In some embodiments, the learning-assisted data reduction subsystem 125 may use different sets of neural network cells to determine different intermediate outputs, where the intermediate output may be a hidden state generated by the neural network that is then directly fed to another set of neural networks. Alternatively, the intermediate output may be processed by another model, such as a statistical model. Each of the intermediate outputs may then be used to determine a user-characterizing set of values. Some embodiments may use a snapshot of a user that is obtained when the user starts a digital session. For example, for a session $S_i$, some embodiments may generate an associated embedding vector $s_i$ using a sequence-to-sequence neural network. Some embodiments may use a sequence of associated embedding vectors in conjunction with their respective digital session connection timepoints and respective snapshot data determined during the digital session timepoints as inputs for a machine learning model. In some embodiments, a timepoint associated with a session may include the timepoint indicating when a connection is established, when a connection is ended, or some timepoint between the establishment/ending times.

Some embodiments may generate a record-characterizing vector that is conducive to generating predictions across multiple timescales by incorporating different periodic function outputs associated with different durations into the inputs of a machine learning model. For example, an application may use a first set of recurrent neural network cells to generate a first hidden state based on a sequence of embedding vectors, an associated sequence of digital session connection timepoints, an associated sequence of snapshots, and a set of durations representing time intervals between digital sessions (e.g., durations between the ending time of a first session and the establishment time of a subsequent session). The application may then use a second set of recurrent neural networks to generate a second hidden state based on the sequence of embedding vectors, the associated sequence of digital session connection times, the associated sequence of snapshots, and a second embedding value representing a second time interval. The application may then provide both sets of hidden states to respective sets of neural networks, such as a set of neural network cells arranged as a feedforward neural network.

Some embodiments may then use the outputs of the pair of neural networks as inputs for a combined set of neural network cells, such as a fully connected neural network layer, where the combined-timescales set of neural network cells may be used to output a record-characterizing vector or another type of record-characterizing set of values. As used in this disclosure, a fully connected neural network layer includes a layer of neural network cells such that each cell of the layer is connected to each activation unit of the cells in the subsequent layer. While the above describes the combined-timescales set of neural network cells receiving two hidden states, some embodiments may provide the combined-timescales set of neural network cells with some other number of hidden states. In some embodiments, each hidden state is an output of a different set of neural network cells or other machine learning model components, where each set of neural network cells of the different sets receives a different time interval embedding vector as an input.

In some embodiments, the prediction subsystem 126 may be used to determine one or more predictions based on collected data, where determining predictions based on collected data may include determining predictions based on computed values generated based on the collected data. For example, the prediction subsystem 126 may use the combined-timescales set of neural network cells that was provided hidden states as inputs by feeding the previously determined record-characterizing set of values to the combined-timescales set of neural network cells as inputs. Some embodiments may then perform one or more of the operations described above for a data session at a subsequent time to determine an actual record-characterizing vector. Some embodiments may then determine a difference between the predicted record-characterizing vector and the actual record-characterizing vector for a self-supervised learning operation. For example, some embodiments may determine a cosine difference between the predicted record-characterizing vector and the actual record-characterizing vector and use the cosine difference as a loss function value to update the model parameters of the combined-timescales set of neural network cells.

In some embodiments, the prediction subsystem 126 may be used to predict various types of information across different timescales. The prediction subsystem may be used to determine a user action type category for a future digital session. For example, some embodiments may train a classifier and use the trained classifier to determine a set of categories representing different user action type categories, such as "account update," "account summary," or "activate." In some embodiments, the classifier may include a neural network. Alternatively, or in addition, the classifier may include a statistical model.

In some embodiments, the prediction subsystem 126 may be used to determine the likelihood of fraud or malicious activity. For example, some embodiments may train and use a random forest model to detect the likelihood of fraud or malicious activity during or after a digital session based on a record-characterizing vector associated with the digital session. Some embodiments may combine the use of record-characterizing vectors or other record-characterizing values with probabilistic models or rules-based models to increase the accuracy of fraud detection.

Figure 2:
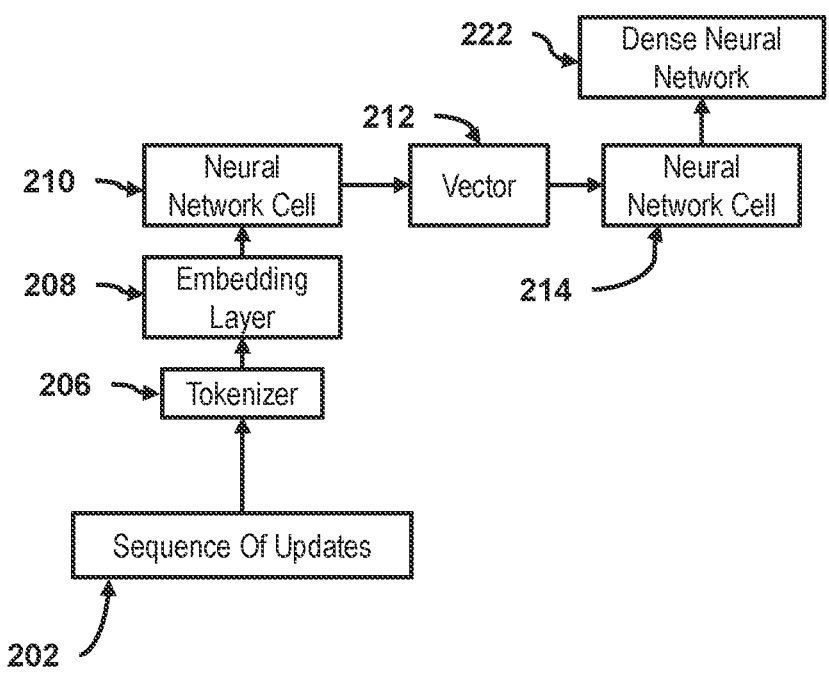
FIG. 2 shows an autoencoder model architecture to generate a vector based on updates obtained during a digital session, in accordance with one or more embodiments.

FIG. 2 shows an autoencoder model architecture to generate a vector based on updates obtained during a digital session, in accordance with one or more embodiments. The autoencoder 200 includes a set of encoder neural network cells 210 and a set of decoder neural network cells 214. In some embodiments, the set of decoder neural network cells 214 may include a same number of neural network cells or a same number of neural network layers as the set of encoder neural network cells 210. A sequence of updates 202 may be provided to a tokenizer 206. The tokenizer 206 may generate tokens and perform other preprocessing operations. The preprocessing operations may include removing stopwords, segmenting different events of a sequence based on delimiters, determining actions based on keywords, etc. The tokenizer 206 may then generate a sequence of tokens based on the sequence of updates 202, where the tokens may be obtained from a data set of tokens accessible to the tokenizer 206.

Some embodiments may then provide the sequence of tokens generated by the tokenizer 206 to a first embedding layer 208, where the first embedding layer 208 may include a set of neural network cells. The first embedding layer 208 may generate an initial hidden state based on the sequence of tokens, where the initial hidden state is then provided to a set of encoder neural network cells 210. The set of encoder neural network cells 210 may include a recurrent network cell, such as an LSTM neural network cell, and may be used to generate a vector 212 that may represent an embedding of the data session associated with the sequence of updates 202. The vector 212 may then be provided as an input for a set of decoder neural network cells 214, where a neural network output of the set of decoder neural network cells 214 may then be provided to a dense neural network 222 to generate an embedding vector for a digital session.

When training the autoencoder 200, some embodiments may initiate a set of randomly determined model parameters for the autoencoder 200. Some embodiments may train the autoencoder 200 for each data session, where the loss function for a training operation may be used to update one or more model parameters of the autoencoder 200. For example, the set of encoder neural network cells 210 and the set of decoder neural network cells 214 may include recurrent neural networks that use cell memory parameters, such as a forget gate value or a memory cell value, which retain or lose values over time based on inputs. For example, the set of encoder neural network cells 210 and the set of decoder neural network cells 214 may include LSTM cells. During a training operation, some embodiments may use the set of cell memory parameters of the autoencoder 200 to generate an embedding vector as a neural network output of the autoencoder 200, while some embodiments may update the cell memory parameter of the cell based on a vector.

Figure 3:
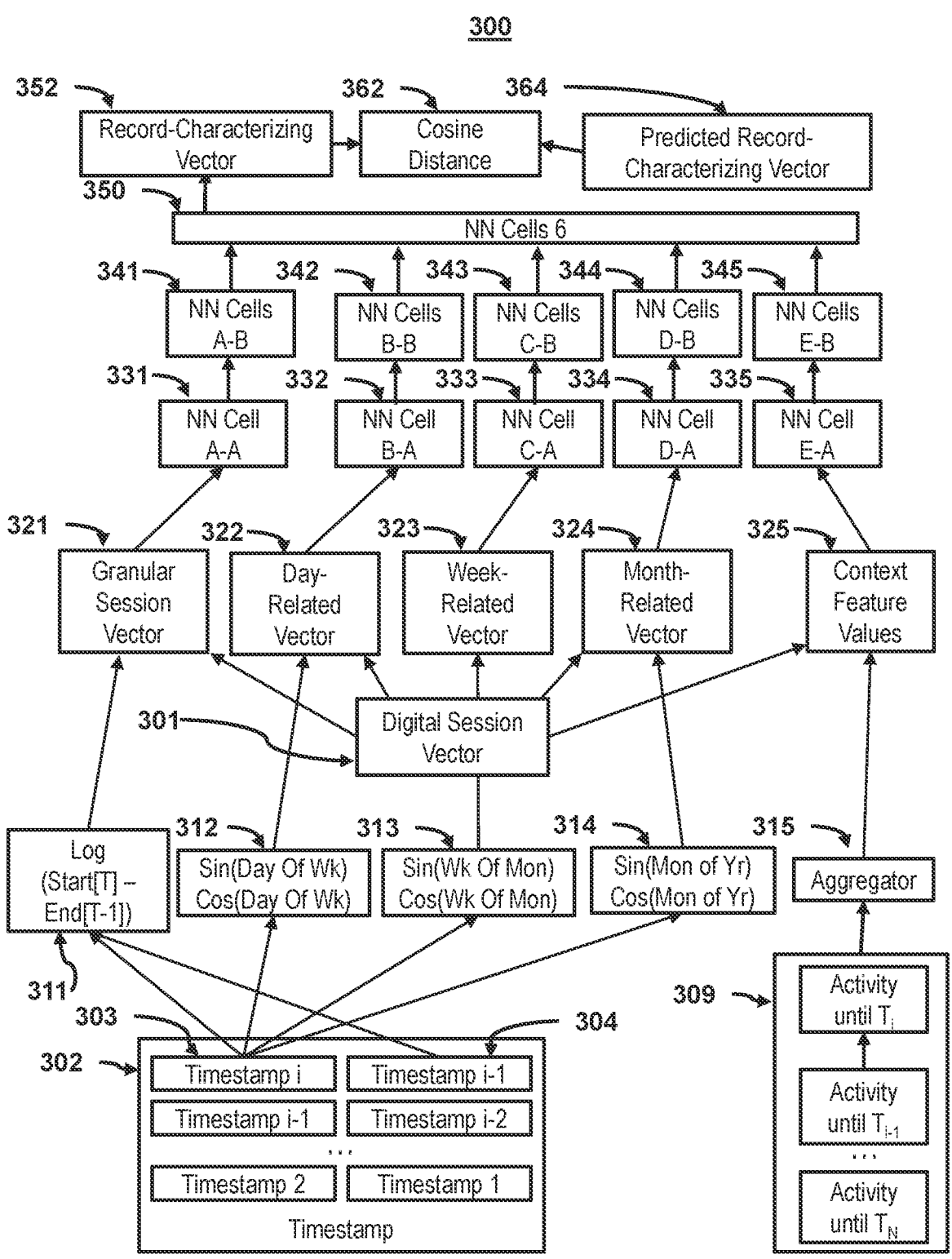
FIG. 3 shows a learning model architecture to dimensionally reduce data, in accordance with one or more embodiments.

FIG. 3 shows a learning model architecture to dimensionally reduce data, in accordance with one or more embodiments. A framework 300 depicts one architecture in which a machine learning model that includes a set of neural network cells 350 may use digital session embedding vectors 301 in conjunction with different timescales to determine a record-characterizing set of values. As shown in the framework 300, some embodiments may provide the intermediate outputs of different separated sets of neural network cells to the set of neural network cells 350 as inputs, where the different separated sets of neural network cells may include neural network cells A-B 341, neural network cells B-B 342, neural network cells C-B 343, neural network cells D-B 344, or neural network cells E-B 345.

Some embodiments may provide components of the framework 300 with a set of timestamps 302, where the timestamps for every session may be provided to each preprocessing module to determine a set of different preprocessing outputs. The set of timestamps 302 may include a first timestamp 303, where the first timestamp 303 is associated with a most recent digital session i, where the most recent digital session i may include a digital session that already ended or a current digital session that has not yet ended. The set of timestamps 302 may also include a second timestamp 304, where the second timestamp 304 is associated with another digital session that directly precedes the most recent digital session. As shown by the framework 300, some embodiments may use a difference between the first timestamp 303 and the second timestamp 304 as an input for downstream calculations. For example, some embodiments may use a first preprocessing module 311 to transform the difference by determining a log of the difference between the first timestamp 303 and the second timestamp 304. In some embodiments the difference may be less than 24 hours, less than 12 hours, less than 1 hour, less than 5 minutes, or less than some other number. Alternatively, or in addition, the difference may be greater than 24 hours, greater than 72 hours, or greater than some other number. Some embodiments may then fuse the transformation result with a digital session vector 301 to determine a set of granular session vectors 321, wherein the digital session vector 301 is determined using a sequence of updates associated with the digital session.

Some embodiments may provide the first timestamp 303 to each module of a set of preprocessing modules that includes the first preprocessing module 311, a second preprocessing module 312, a third preprocessing module 313, and a fourth preprocessing module 314. Each of the preprocessing modules 312-314 may be used to determine a periodic function result of a periodic function, where a period of the periodic function may be based on different durations. For example, the second preprocessing module 312 may include a parameter for a periodic function that defines a period of the periodic function to be equal to one week. Some embodiments may then determine a day-related vector based on the periodic function result of this periodic function. Similarly, the third preprocessing module 313 may include a parameter for a periodic function that defines a period of the periodic function to be equal to one month, and the fourth preprocessing module 314 may include a parameter for a periodic function that defines a period of the periodic function to be equal to one year. Some embodiments may use the set of periodic function results of the third preprocessing module 313 and the fourth preprocessing module 314 to determine a week-related vector 323 and a month-related vector 324, respectively.

In some embodiments, the digital session vectors 301 determined from a sequence of updates using one or more operations described in this disclosure may be fused with an output of the first preprocessing module 311. Some embodiments may fuse a digital session vector 301 with a transformation of the difference in time by concatenating the digital session vector with the transformation of the difference. Some embodiments may perform similar operations by fusing the digital session vector with a set of periodic function results. For example, some embodiments may fuse the digital session vector of a current digital session with an output of the second preprocessing module 312 to determine a day-related vector 322. Similarly, some embodiments may use the digital session vector of the current digital session with an output of the third preprocessing module 313 and an output of the fourth preprocessing module 314 to determine the week-related vector 323 and the month-related vector 324.

Some embodiments may retrieve a set of context values 309 and provide the set of context values 309 to an aggregator module 315. Some embodiments may retrieve the set of context values 309 from a record identified by or otherwise associated with a digital session, where data from the digital session was used to generate a set of digital session vectors 301. For example, some embodiments may determine an identifier based on login information provided during the initiation of a digital session and obtain a set of database transaction records and financial states based on the identifier. Some embodiments may then use the aggregator module to format the set of context values 309 into a form that may then be fused with the digital session vectors 301. Furthermore, while some embodiments may fuse the digital session vectors 301 with outputs of each of the modules 311-315, some embodiments may fuse the digital session vectors with only some of the outputs. For example, some embodiments may fuse the digital session vectors with only the outputs of the first preprocessing module 311, where the digital session vector 301 is not fused with an output of the aggregator module 315. By not performing this fusion, a set of context feature values 325 may be an output of the aggregator module 315 does not include the digital session vectors 301.

Some embodiments may then provide each vector of a sequence of vectors 321-324 and the context feature values 325 to a respective set of neural network cells of first sets of neural network cells 331-335. For example, each of set of neural network cells of the first sets of neural network cells 331-335 may include an LSTM neural network cell. Some embodiments may then provide each respective output of a set of neural network cells 331 to second sets of neural network cells 341-345. In some embodiments, the second sets of neural network cells 341-345 may be different from the first sets of neural network cells 331-335 with respect to connection architecture of neural network cell components. For example, the set of neural network cells 341 may form a fully connected neural network comprising at least four neural network cells and the set of neural network cells of the set of neural network cells 331 may be a single LSTM neural network cell. The hidden state output of the single LSTM neural network cell of the set of neural network cells 331 may be provided to the fully connected neural network of the set of neural network cells 341, where the output of the fully connected neural network may be provided to a set of neural network cells 350.

Some embodiments may provide the outputs of the first sets of neural network cells 331-335 to the set of neural network cells 350 to determine a multi-timescale, record-characterizing vector 352. Some embodiments may provide the outputs to the set of neural network cells 350 by fusing the outputs of the first sets of neural network cells 331-335. For example, some embodiments may concatenate the outputs of the first sets of neural network cells 331-335 and provide the concatenated values to the set of neural network cells 350. During a training operation, some embodiments may provide the multi-timescale, record-characterizing vector 352 to the set of neural network cells 350 to determine a predicted record-characterizing vector 364. Some embodiments may then perform operations similar to or the same as those described above to determine an actual record-characterizing vector after obtaining data for a subsequent data session. Some embodiments may then determine a difference between the predicted record-characterizing vector and the actual record-characterizing vector by using a cosine distance module 362. Some embodiments may then use the difference as a loss function to update neural network cell parameters of the set of neural network cells 350.

Flowchart

Figure 4:
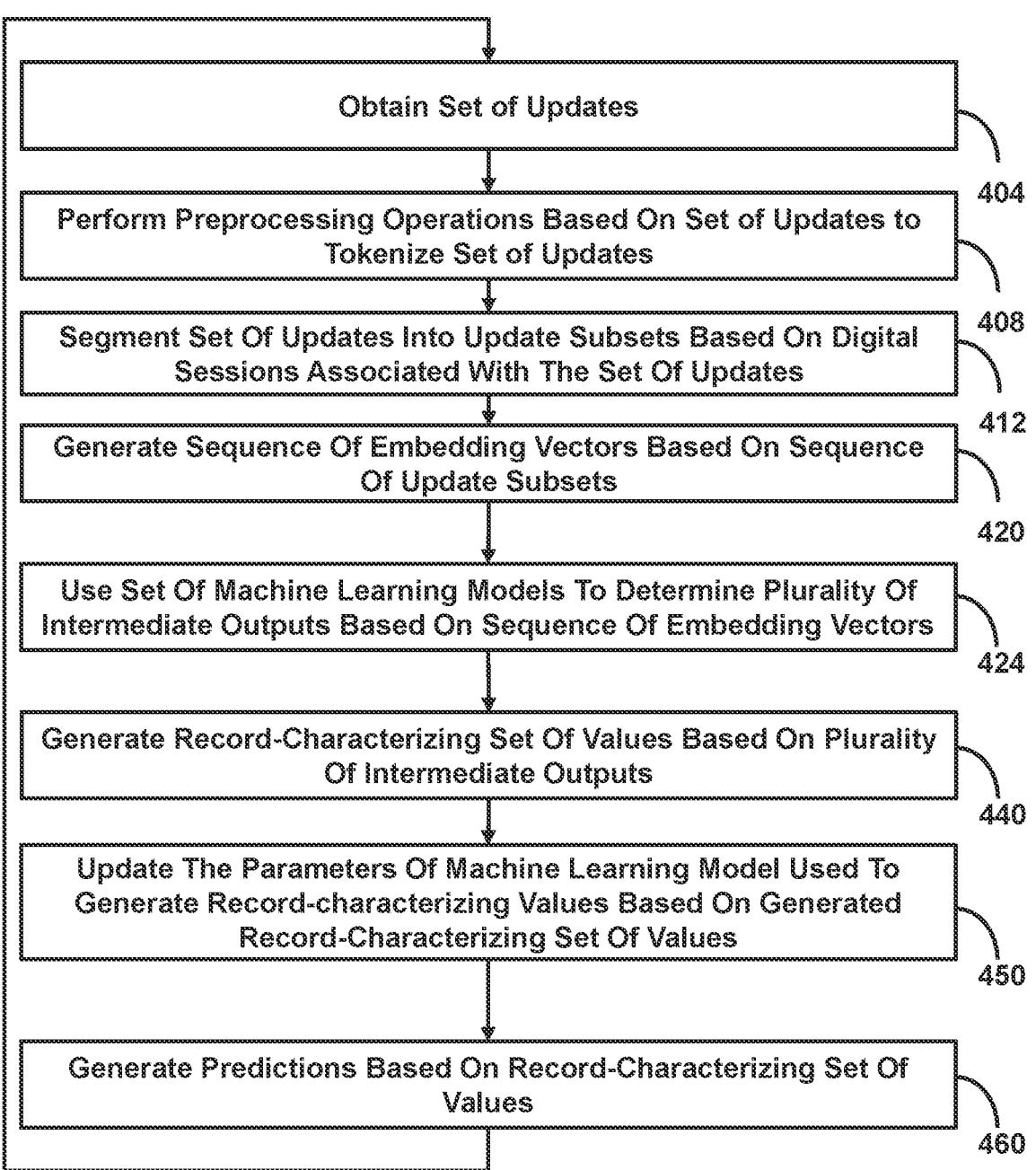
FIG. 4 shows a flowchart of a process to dimensionally reduce data, in accordance with one or more embodiments.

FIG. 4 shows a flowchart of a process to dimensionally reduce data, in accordance with one or more embodiments. Operations of the process 400 may begin at block 404. Some embodiments may obtain a set of updates, as indicated by block 404. Obtaining the sequence of updates may include obtaining a sequence of values representing events or actions performed by a user. For example, some embodiments may receive data via an event stream from a client computer device, where the data may indicate webpages or application screens visited by a user, user interface elements interacted with by the user, data entered into a UI, etc.

Some embodiments may then perform operations to convert the event stream or other data obtained from a client computer device into a sequence of values interpretable as inputs for a machine learning model. For example, some embodiments may obtain an initial string that includes different hyperlinks to webpages visited by a user and event identifiers representing a user interaction or data submission by the user. Some embodiments may then perform a set of preprocessing operations to tokenize the string into a sequence of values representing events, where the values may be used to update a record of user activity.

Some embodiments may also obtain a set of user-related data, such as database transactions caused by user-provided instruction queries, financial data, or other data. For example, after a user logs in to their account to cause one or more updates to a user record, or other values associated with the user, some embodiments may obtain a snapshot of financial data associated with the user at the time of login. Some embodiments may determine or obtain other information, such as biometric information, and include the biometric information in a set of updates used to determine one or more record-characterizing values.

Some embodiments may use a mapping function to convert web requests or other messages into categories before storing the category as an element of a set of updates. For example, some embodiments may obtain a web request addressed to a uniform resource locator (URL). The message may include a request or query that causes a server to send a resource or a change to value based on the message. For example, some embodiments may update a stored value of a record based on the message. Some embodiments may then map the URL to an action type category based on one or more detected strings of the URL matching a category of a stored set of action type categories before then storing the category to a set of updates.

Some embodiments may perform preprocessing operations on the sequence of updates to tokenize the set of updates, as indicated by block 408. Some embodiments may obtain the sequence of updates as a string or list of event stream data. For example, some embodiments may obtain an event stream, where each event may represent a change in an application state of an application executing on a client computer device, or instructions from or to the application.

Some embodiments may store event data directly onto a record of events for use as a set of updates. Alternatively, or in addition, some embodiments may store event data onto an event streaming platform, where the event streaming platform performs one or more preprocessing operations or other operations described in this disclosure. For example, some embodiments may store event streaming data using Amazon AWS Kinesis™, Azure Event Hubs™, a managed Apache Kafka™ service, etc. Some embodiments may then store the event data into different partitions, where the event data may be provided to an event consumer to perform operations indicated by the event where the event data may be stored for use as a set of updates for determining record-characterizing vectors or other operations described in this disclosure.

Some embodiments may perform one or more natural language preprocessing operations on event stream data or other data representing a set of updates. Such natural language preprocessing operations may include operations to tokenize words, to stem words, to lemmatize words, etc., for example, some embodiments may use a tokenizer to tokenize a set of updates or otherwise standardize words, addresses, category names, or other values stored in the set of updates. For example, some embodiments may use a tokenizer to conform a first string "linking" and a second string "linker" to the string "link."

Some embodiments may segment the preprocessed set of updates into update subsets based on the digital sessions associated with the set of updates, as indicated by block 412. Some embodiments may determine a set of update subsets based on timepoints associated with a login time for a digital session and a logout time associated with the digital session, where a timepoint may be indicated by a timestamp. For example, if a first update of a set of updates is indicated to have occurred at 3:23 p.m. on Apr. 4, 2021, based on a timestamp of the first update, some embodiments may add or otherwise assign the first update to a first subset of updates associated with a first digital session, where the first digital session occurred on Apr. 4, 2021, between 3:20 p.m. and 3:30 p.m. Similarly, if a second update of the set of updates is indicated to have occurred at 3:39 p.m. on Apr. 4, 2021, based on a timestamp of the second update, some embodiments may add or otherwise assign the second update to a second subset of updates, where the second digital session occurred on Apr. 4, 2021, between 3:35 p.m. and 3:45 p.m. In some embodiments, a digital session may be detected while the digital session is being established, where the time boundaries of the digital session may be determined based on timepoints associated with events that create or destroy the digital session. For example, some embodiments may determine the boundaries of a connection session based on a first timestamp indicating a timepoint when a session connection was established and a second timestamp indicating a timepoint when the connection ended (e.g., by user logout, time-out, etc.).

In some embodiments, after segmenting the preprocessed sequence of updates, each update of a set of updates may be added to or otherwise assigned to an update subset that is associated with a digital session. In some embodiments, each update of an update subset associated with a digital session may be made or otherwise caused by events that occurred during the digital session. In some embodiments, one or more events or another type of update may be associated with a timestamp that is generated outside of a digital session. Some embodiments may define additional time segments to represent these other time blocks and treat these other time blocks as their own dummy digital sessions for later analysis.

Some embodiments may generate a sequence of embedding vectors based on the sequence of update subsets, as indicated by block 420. Some embodiments may use a set of neural network cells arranged in the form of a sequence-to-sequence neural network or another type of machine learning model to determine an embedding vector for an update subset of a sequence of update subsets, where the embedding vector is associated with the update subset. Furthermore, some embodiments may associate the embedding vector with the digital session associated with the update subset. Various sequence-to-sequence neural networks may be used, where the sequence-to-sequence neural network may include using an LSTM or a gated recurring unit (GRU) neural network. Some embodiments incorporate the use of additional neural network features or alternate neural networks when determining an embedding sequence. For example, some embodiments may use an attention unit to determine which tokens of a token sequence representing an update subset should be more heavily weighted, where the attention unit may include a trained fully connected neural network that provides a set of attention weights for the tokens of the token sequence.

Some embodiments may generate a same length embedding vector for different types or different lengths of digital sessions that occur at different times. For example, some embodiments may generate a first vector associated with a first digital session, where the first digital session is indicated to have occurred on a first day, and generate a second vector associated with a second digital session, where the second digital session is indicated to have occurred on a second day. In some embodiments, the first and second vectors may have the same number of elements. As described elsewhere in this disclosure, some embodiments may determine outputs based on each of the embedding vectors and a time difference between the first and second digital sessions.

Some embodiments may use a set of machine learning models to determine a plurality of intermediate outputs based on the sequence of embedding vectors, as indicated by block 424. Some embodiments may determine multiple time-related values that correspond with different machine learning models, or different components of a machine learning model. For example, some embodiments may use different sets of neural networks that are isolated from each other. As used in this disclosure, two neural networks may be isolated from each other if the hidden layers of the neural networks have no connection to each other. For example, a first neural network may include a first input layer, a first hidden layer, and a first output layer, and a second neural network may include a second input layer, a second hidden layer, and a second output layer. The first neural network is isolated from the second neural network if the outputs of any neural network cells of the first input layer or the first hidden layer are not provided to any neural network cells of the second neural network.

Some embodiments may use a same type of neural network cell or a same architecture of a neural network for each of the different machine learning models, or components of machine learning models used to determine a set of intermediate outputs. For example, some embodiments may provide a first embedding vector fused with a first time difference and a second embedding vector fused with a second time difference as inputs to a first set of LSTM cells to determine a first intermediate output. Some embodiments may then determine a second intermediate output by providing a second set of LSTM cells with an output of a periodic function, such as "output=Sin[$2\pi D/7$]," where D is determined from a timestamp associated with a digital session and may be a value ranging from zero to six to indicate a day of the week. Some embodiments may fuse the output of the periodic function with an associated embedding vector before providing the fused result to the second set of LSTM cells, where the associated embedding vector is associated with the timestamp. Alternatively, some embodiments may provide the output of the periodic function to the second set of LSTM cells without fusing the output with the associated embedding vector.

Some embodiments may determine a plurality of intermediate outputs associated with different periodic functions, where the periodic functions may be a smooth function (e.g., a trigonometric function) or a non-smooth function (e.g., a triangle wave function, a sawtooth wave function, a square wave function, a cycloid function, etc.). Some embodiments may determine a ratio and use the ratio as an input for a periodic function, where the ratio may be a ratio of a time interval segment to a time interval, where the time interval is longer than the time interval segment. For example, a time interval may be a month, and a day may be a time interval segment of the time interval. The ratio may represent a periodic time measurement (e.g., an hour of the day, a day of the week, a month of the year, etc.). In some embodiments, the ratio for a digital session or vector associated with the digital session may be determined based on a timestamp that indicates a starting time, ending time, or some other timepoint between the starting and ending times of the digital session.

As described above, some embodiments may use multiple periodic functions. For example, some embodiments may use first, second, and third periodic functions to determine a set of periodic function results corresponding with a day-related timescale, a week-related timescale, and a month-related timescale. The first periodic function may provide a periodic function result based on an hour of a 24-hour day by using a function that includes "output=Sin[$2\pi H/24$]," where H may represent the hour indicated by a timestamp associated with a digital session. The second periodic function may provide a periodic function result based on a day of a 7-day week by using a function that includes "output=Sin[$2\pi D/7$]" as described above. The third periodic function may provide a periodic function result based on a month of a 12-month year by using a function that includes "output=Sin[$2\pi M/12$]," where M may be a month value between 0 and 11 indicated by the timestamp. Some embodiments may provide the first, second, and third functions to a first, second, and third neural network model, where each of the neural network models may have different model parameters. In some embodiments, the ratio may be a ratio of two integers. For example, a timestamp may correspond with 3.6 hours and the period may be a 24-hour period, where some embodiments may round the value 3.6 hours to 4 hours and use the ratio 4/24 to determine a periodic function result. Alternatively, some embodiments may use ratios of value that are themselves ratios. For example, some embodiments may use the ratio 3.6/24 as an input ratio for a periodic function.

Some embodiments may provide a user or agent with the option to provide domain-specific periodic time intervals and time interval segments. For example, some embodiments receive a periodic time interval amounting to a total of 30 hours and a time interval segment equal to 90 minutes. Some embodiments may then segment a repeating 30-hour period into a set of 90-minute segments. After segmenting the 30-hour period, some embodiments may determine which segment of the 90-minute segments to assign to an embedding vector based on the 90-minute segment identified by a timestamp associated with the digital session associated with the embedding vector.

Some embodiments may use a set of context values obtained from or otherwise associated with a record being characterized. For example, some embodiments may obtain a data snapshot of a user during a login event of a digital session, where the data snapshot is associated with the digital session. Some embodiments may then aggregate the data snapshot for use as an input into a neural network model or another type of machine learning model to generate a context vector. As described elsewhere in this disclosure, some embodiments may use one or more neural networks or other machine learning models based on the context vector to generate another intermediate output.

Some embodiments may generate a record-characterizing set of values based on a plurality of intermediate outputs, as indicated by block 440. Some embodiments may determine the record-characterizing set of values by using a fully connected neural network or another type of neural network. Some embodiments may fuse the intermediate outputs or results based on the intermediate outputs together and provide the fused set of values to a neural network or another type of machine learning model. In some embodiments, the neural network used to determine the record-characterizing set of values may be a sequence-to-sequence neural network, where the input to the sequence-to-sequence neural network may also be a vector. The intermediate outputs may be associated with different periods of time, where the contributions created by the different intermediate outputs is reflected in a record-characterizing set of values generated from the intermediate outputs. For example, some embodiments may generate three hidden state outputs, where each hidden state output is generated from a granular session vector, a time of day, or a week of the month. By generating a record-characterizing vector based on these inputs, the likelihood of certain actions across different times of day, days of a week, or months of a year may be better predicted based on the record-characterizing vector.

In some embodiments, the neural network used to generate the record-characterizing set of values includes machine learning models such as a fully connected neural network, an LSTM neural network, another type of neural network, a transformer neural network, etc. It should be understood in this disclosure that the use of a recurrent neural network such as an LSTM neural network may be substituted with the use of other neural networks. For example, the neural network used to generate an intermediate output or a record-characterizing set of values may include a transformer neural network. A transformer neural network may be trained to generate a set of attention values that assign attention weights to an input sequence, increasing the accuracy of a neural network output. For example, some embodiments may generate a set of attention values based on a vector sequence (e.g., a sequence of embedding vectors) and then generate a result based on the set of attention values and the vector sequence.

When fusing the different intermediate outputs into an input set of values for a neural network, some embodiments generate an input set of values that share a same number of elements as the output of the neural network. For example, some embodiments may fuse a first intermediate output having 10 elements, a second intermediate output having 6 elements, a third intermediate output having 6 elements, a fourth intermediate output having 12 elements, and a fifth intermediate output having 5 elements into a vector having 39 elements. The 39-element vector generated as an input for a neural network may then be provided to the neural network, which may then be used to generate a 39-element output vector. Furthermore, in comparison to the amount of data stored in a sequence of updates used to generate a record-characterizing vector, the dimensionality of the record-characterizing vector may be significantly less than a count of unique elements of the sequence of updates. For example, a sequence of updates may include 6000 unique elements representing different updates made across 23 digital sessions. Some embodiments may generate 64-element record-characterizing vectors based on the 6000-element sequence of updates.

Some embodiments may update the parameters of the machine learning model used to generate record-characterizing values based on the generated record-characterizing set of values, as indicated by block 450. After determining a record-characterizing set of values based on a digital session, some embodiments may compare the determined record-characterizing set of values with a predicted record-characterizing set of values. For example, some embodiments may use a machine learning model described in this disclosure to generate a first record-characterizing vector based on a sequence of embedding vectors generated from updates of a first sequence of digital sessions. Some embodiments may then provide the first record-characterizing vector to the machine learning model to determine a predicted record-characterizing vector for the next digital session. After obtaining a set of updates associated with the next digital session, some embodiments may then perform operations similar to those described above to determine a second record-characterizing vector based on the updates of the next digital session indicated to have been caused by events or actions that occurred during the next digital session. Some embodiments may then determine a loss function value based on a difference (e.g., a cosine distance) between the predicted record-characterizing vector and the second record-characterizing vector and update neural network parameters of a neural network or other learning model based on the difference, where a difference that is equal to zero may result in no change to the learning model parameter.

Some embodiments may generate predictions based on the record-characterizing set of values, as indicated by block 460. Some embodiments may generate predictions that select one or more user intent categories to associate with a user based on a record-characterizing vector. For example, some embodiments may use a classifier model such as a naïve Bayes model, decision tree model, K-nearest neighbors, or support vector machines to assign one or more categories of a set of user intent categories to a user record based on a record-characterizing vector of the user record.

Some embodiments may use different downstream neural networks or other machine learning models to determine predictions associated with different applications. For example, some embodiments may provide a record-characterizing vector to a random forest model to output a learning model output, where a determination that the first value satisfies a first threshold indicates that a user account associated with the record-characterizing vector has been hijacked. Some embodiments may then provide the same record-characterizing vector to a decision tree model to output a second value, where the second value indicates that a user is planning on deleting one or more account records.

Some embodiments may lock database values or determine that an alarm is triggered based on a record-characterizing vector or another type of record-characterizing set of values. For example, based on a determination that a user record has been hijacked or that the user record is associated with malicious activity, some embodiments may modify the permissions of the user record. Furthermore, some embodiments may determine allocations of computer resources associated with a user record based on a record-characterizing set of values associated with the user record. For example, based on a determination that a record-characterizing vector associated with a user predicts increased user activity on the weekend, some embodiments may pre-push data from a centralized server to an edge computing base station within a pre-set distance of the user and delete the data on the weekday.

Some embodiments may generate predictions for future digital sessions based on a sequence of embedding vectors that is associated with a sequence of digital sessions. For example, after determining a sequence of embedding vectors, some embodiments may use a trained neural network or another type of machine learning model to determine that a user will request human assistance during a real-time inter-action. Alternatively, or in addition, the sequence of embedding vectors may be combined with a record-characterizing value, where the combined set of values may be provided to a machine learning model to predict a value for a future digital session. Some embodiments may then return to operations described for block 404 after receiving an additional set of updates.

In some embodiments, operations of the disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory machine-readable medium, such as an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIGS. 3-4.

In some embodiments, one or more components of a computer system may include an API layer, such as an API layer that is implemented on one or more components of a cloud system. The computer system may be partially based on the API layer such that there is strong adoption of representational state transfer (REST)ful web services or simple object access protocol (SOAP) web services. For example, some embodiments may receive a set of user inputs using RESTful web services. Alternatively, a computer system may be fully based on the API layer, such that separation of concerns between layers like API layer, services, and applications are in place.

In some embodiments, the system architecture of the one or more components of a computing system may use a microservice approach. For example, some embodiments may include a front-end layer and a back-end layer where microservices reside. In such an architecture, an API layer may include a middleware component to provide integration between front-end and back-end layers, where the API layer performs one or more operations described in this disclosure. For example, a middleware component of the API layer may receive a sequence of user inputs from a client computer device, such as the client computer device 102. Some embodiments may then generate a record-characterizing vector based on the sequence of user inputs. The API layer may use one or more types of communication systems, such as RESTful APIs, an advanced message queuing protocol (e.g., Apache Kafka, AMQP, etc.), gRPC, etc.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more forms of electronic storage (e.g., electronic storage media to store the set of databases 130), one or more physical processors programmed with one or more computer program instructions, and/or other components. The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communications paths linking a plurality of hardware, software, and/or firmware components operating together. For example, the computing devices may be implemented by a cloud of computing platforms operating together as the computing devices.

Each of these devices described in this disclosure may also include electronic storage media. The electronic storage media may include non-transitory storage media that electronically stores information. The storage media of the electronic storage media may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storage media may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage media may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-126 or other subsystems. The processors may be programmed to execute computer program instructions by software; hardware; firmware;

some combination of software, hardware, or firmware; and/ or other mechanisms for configuring processing capabilities on the processors.

It should be appreciated that the description of the functionality provided by the different subsystems 124-126 described herein is for illustrative purposes, and is not intended to be limiting, as any of subsystems 124-126 may provide more or less functionality than is described. For example, one or more of subsystems 124-126 may be eliminated, and some or all of the functionality of such subsystem(s) may be provided by other ones of subsystems 124-126. As another example, additional subsystems may be programmed to perform some or all of the functionality attributed herein to one of subsystems 124-126.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompass both all such attributes or functions being mapped to all such objects and subsets of the attributes or functions being mapped to subsets of the objects (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y"), in contrast to statements that might be improperly argued to imply sequence limitations (e.g., "performing X on items, performing Y on the X'ed items") used for purposes of making claims more readable rather than specifying sequence. Statements referring to "at least Z of A, B, and C" and the like (e.g., "at least Z of A, B, or C") refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Enumerated Embodiments

The present techniques will be better understood with reference to the following enumerated embodiments:

1. A method comprising: segmenting a set of updates associated with a record into a set of update subsets, wherein each update subset of the set of update subsets is associated with a different time interval; generating a set of vectors by, for each update subset of the set of update subsets, generating a vector of the set of vectors using a first machine learning model, wherein the generated vector is associated with the update subset; determining a first output using a second machine learning model based on the set of vectors; determining a set of outputs using a set of machine learning models based on a timepoint; generating a set of values based on the first output and the set of outputs using a third machine learning model; and storing the set of values in memory in association with the record.

2. The method of embodiment 1, wherein the timepoint is a timepoint of the set of updates.

3. The method of any of embodiments 1-2, wherein determining the set of outputs comprises determining the set of outputs using the set of machine learning models based on a set of periodic function results, wherein the set of periodic function results are based on a timepoint associated with an update of the set of updates.

4. A method for reducing data dimensionality by generating a record-characterizing vector, comprising a computer method that comprises one or more processors programmed with computer program instructions that, when executed, cause the computer method to perform operations comprising: segmenting a sequence of updates associated with a record into a sequence of update subsets based on an associated set of sessions, wherein updates in each respective update subset of the sequence of update subsets occur during a same session of the set of sessions; generating a vector sequence based on the sequence of update subsets using a first set of neural network cells by: generating a first vector based on a first update subset using the first set of neural network cells, the first update subset associated with a first session indicated to have occurred on a first day; and generating a second vector based on a second update subset using the first set of neural network cells, the second update subset associated with a second session; generating a record-characterizing vector for the record based on the vector sequence and the first day, wherein a dimensionality of the record-characterizing vector is less than a count of unique elements of the sequence of updates, by: determining a first output using a second set of neural network cells based on the first vector, the second vector, and a time difference between the first session and the second session; determining a second output using a third set of neural network cells based on a ratio indicating a day of a week of the first day; generating the record-characterizing vector using a fourth set of neural network cells based on the first output and the second output; and storing the record-characterizing vector in memory in association with the record.

5. A method comprising: segmenting a set of updates associated with a record into a set of update subsets, wherein updates of an update subset of the set of update subsets are indicated to have occurred during a digital session associated with the update subset; generating a first vector based on a first update subset using a first set of neural network cells, the first update subset associated with a first session and associated with a timestamp; and generating a second vector based on a second update subset using the first set of neural network cells, the second update subset associated with a second session; determining a first output using a second set of neural network cells based on the first vector, the second vector, and a time difference between the first session and the second session; selecting a time interval segment of a periodic time interval based on the timestamp; determining a second output using a third set of neural network cells based on a ratio, wherein the ratio is based on the time interval segment and the periodic time interval; generating a record-characterizing vector using a fourth set of neural network cells based on the first output and the second output; and storing the record-characterizing vector in memory in association with the record.

6. The method of any of embodiments 1 to 5, wherein the record is a first record, and wherein generating the record-characterizing vector further comprises: obtaining a first context value of the record associated with the first session or the first day, wherein the first context value is stored in a second record associated with an identifier used to establish the first session; and determining a third output using a fifth set of neural network cells, wherein generating the record-characterizing vector comprises providing the third output to the fourth set of neural network cells.

7. The method of any of embodiments 1 to 6, wherein determining the second output comprises: determining the day of the week based on a timestamp associated with the first vector; determining the ratio based on the day of the week; providing the ratio as an input to a periodic function; and determining the second output using the third set of neural network cells by providing the third set of neural network cells to the periodic function.

8. The method of any of embodiments 1 to 7, wherein the record-characterizing vector is a first record-characterizing vector, further comprising: generating a predicted record-characterizing vector based on the record-characterizing vector; updating the set of updates with an additional update subset associated with a third session that occurs after the first session; determining a second record-characterizing vector based on the updated set of updates; determining a difference based on the predicted record-characterizing vector and the second record-characterizing vector; and updating model parameters of the fourth set of neural network cells based on the difference.

9. The method of any of embodiments 1 to 8, further comprising generating a third vector based on a third update subset using the first set of neural network cells, wherein: the third update subset is associated with a third session; and determining the first output comprises providing the third vector and a difference between the second session and the third session to the second set of neural network cells.

10. The method of any of embodiments 1 to 9, wherein determining the second output comprises: generating a periodic function result of a periodic function based on a timestamp of an update of the first update subset, wherein the timestamp is within the first time interval; and providing the third set of neural network cells with the periodic function result of the periodic function to determine the second output.

11. The method of any of embodiments 1 to 10, wherein the periodic function comprises a trigonometric function.

12. The method of any of embodiments 1 to 11, wherein the time difference between the first session and the second session is less than 24 hours.

13. The method of any of embodiments 1 to 12, further comprising determining the first session based on a first timestamp indicating a time that a connection of the first session was established and a second timestamp indicating a time that a connection of the first session was ended.

14. The method of any of embodiments 1 to 13, further comprising: determining a learning model output by providing the record-characterizing vector to a first machine learning model; determining whether the learning model output satisfies a threshold; and based on a determination that the learning model output satisfies the threshold, select a category value from a set of category values to assign to the record.

15. The method of any of embodiments 1 to 14, wherein the periodic time interval is a first periodic time interval, and wherein the time interval segment is a second time interval segment, and wherein the ratio is a first ratio, further comprising: obtaining a second periodic time interval from a client computer device; obtaining a second time interval segment from the client computer device; determining a second ratio based on the second periodic time interval, the second time interval segment, and the timestamp; and determining a third output using a fifth set of neural network cells based on the second ratio, wherein generating the record-characterizing vector comprises generating the record-characterizing vector using the fourth set of neural network cells based on the third output.

16. The method of any of embodiments 1 to 15, wherein: the second machine learning model comprises a transformer neural network; and generating the first output comprises: determining a set of attention values using the transformer neural network based on the set of vectors, wherein each attention value of the set of attention values is associated with a vector of the set of vectors; and generating the first output based on the set of attention values.

17. The method of any of embodiments 1 to 16, wherein: the set of machine learning models comprises a fourth machine learning model and a fifth machine learning model, wherein at least one learning model parameter of the fourth machine learning model and the fifth machine learning model differ; determining the set of outputs comprises: determining a first ratio representing an hour of a day based on the timepoint; determining a second ratio representing a month of a year based on the timepoint; determining a first periodic function result based on the first ratio; determining a second periodic function result based on the second ratio; determining a second output of the set of outputs using the fourth machine learning model based on the first periodic function result; determining a third output of the set of outputs using the fourth machine learning model based on the second periodic function result; and generating the set of values comprises generating the set of values based on the second output and the third output.

18. The method of any of embodiments 1 to 17, wherein the set of update subsets is a first set of update subsets, the operations further comprising training the third machine learning model by: predicting a subsequent set of values based on a second set of outputs using the third machine learning model; obtaining a second set of update subsets, wherein the second set of update subsets comprises at least one update subset of the first set of update subsets and an additional update subset associated with a new session; generating a second set of values based on the second set of update subsets; generating a third set of values based on a third set of outputs using the third machine learning model; determining a cosine distance between the subsequent set of values and the set of values; and updating model parameters of the third machine learning model based on the cosine distance.

19. The method of any of embodiments 1 to 18, wherein the set of updates comprises values identifying clickstream events.

20. The method of any of embodiments 1 to 19, the operations further comprising: determining that a digital session was established; and obtaining the record based on identifiers of the digital session.

21. The method of any of embodiments 1 to 20, the operations further comprising: obtaining a web request addressed to a uniform resource locator comprising a request for a resource or a change to a value of the record; mapping the uniform resource locator to an action type category based on a stored set of action type categories; and adding the action type category to the set of updates.

22. The method of any of embodiments 1 to 21, wherein the third machine learning model comprises a fully connected neural network layer.

23. One or more tangible, non-transitory machine-readable media storing instructions that, when executed by one or more processors, effectuate operations comprising those of any of embodiments 1-22.

24. A system comprising: one or more processors; and memory storing computer program instructions that, when executed by the one or more processors, cause the one or more processors to effectuate operations comprising those of any of embodiments 1-22.

What is claimed is:

1. A system for reducing data dimensionality for model inputs via record-characterizing model input vectors, the system comprising:

one or more processors and one or more memory storing computer program instructions that, when executed, causes the one or more processors to perform operations comprising:

inputting a respective update subset of a sequence of updates associated with a record into first neural network cells;

for each respective session vector of a session vector sequence derived from output of the first neural network cells in connection with inputting the respective update subset into the first neural network cells, inputting (1) the respective session vector and a time difference between sessions of a set of sessions during which the sequence of updates occur into second neural network cells and (2) the respective session vector and a respective periodic function output derived from a ratio indicating a respective time of a day or a respective day of a week into third neural network cells;

inputting a granular vector set and a periodic vector set into fourth neural network cells, the granular vector set being derived from output of the second neural network cells in connection with inputting the respective session vectors and the time difference into the second neural network cells, the periodic vector set being derived from output of the third neural network cells in connection with inputting the respective session vectors and the respective periodic function outputs into the third neural network cells; and pre-pushing data based on one or more predicted user actions that correspond to a record-characterizing vector derived from output of the fourth neural network cells in connection with inputting the granular vector set and the periodic vector set into the fourth neural network cells, wherein the record-characterizing vector characterizes multiple timescales of update data stored in the record and has a dimensionality less than a count of unique elements of the sequence of updates.

2. The system of claim 1, wherein the record is a first record, and wherein the set of sessions comprises a first session occurring on a first day, the operations further comprising:

inputting a first context value of the record associated with the first session or the first day into fifth neural network cells, wherein the first context value is stored in a second record associated with an identifier used to establish the first session, wherein the record-characterizing vector is derived in connection with inputting output of the fifth neural network cells into the fourth neural network cells.

3. The system of claim 1, wherein the session vector sequence comprises a first vector, and wherein the set of sessions comprises a first session occurring on a first day, and wherein inputting the respective session vectors and the respective periodic function outputs into the third neural network cells comprises inputting the first vector and a first periodic function output into the third neural network cells, the first periodic function output being derived from providing the respective ratio indicating the first day to a periodic function.

4. A method comprising:

inputting a respective update subset, associated with a respective session, of a sequence of updates associated with a record into a first set of neural network cells;

for each respective vector of a plurality of session vectors derived from output of the first set of neural network cells in connection with inputting the respective update subset into the first set of neural network cells, inputting (1) the respective vector and a time difference between sessions of a set of sessions into a second set of neural network cells and (2) a respective periodic function output derived from a respective periodic interval segment of a periodic time interval into a third set of neural network cells;

inputting a first vector set and a second vector set into a fourth set of neural network cells, the first vector set being derived from output of the second set of neural network cells in connection with inputting the respective vectors and the time difference into the second set of neural network cells, the second vector set being derived from output of the third set of neural network cells in connection with inputting the respective vectors and the respective periodic function outputs into the third set of neural network cells; and pre-pushing data or computing resources based on one or more predicted user actions that correspond to a record-characterizing vector derived from output of the fourth set of neural network cells in connection with inputting the first vector set and the second vector set into the fourth set of neural network cells, wherein the record-characterizing vector represents a user record.

5. The method of claim 4, further comprising segmenting a set of updates associated with the record into a set of update subsets, wherein the record-characterizing vector is a first record-characterizing vector, further comprising:

generating a predicted record-characterizing vector based on the record-characterizing vector;

determining an updated set of updates by updating the set of updates with an additional update subset associated with a third session that occurs after a first session of the set of sessions;

determining a second record-characterizing vector based on the updated set of updates;

determining a difference based on the predicted record-characterizing vector and the second record-characterizing vector; and updating model parameters of the fourth set of neural network cells based on the difference.

6. The method of claim 4, further comprising generating a third vector based on a third update subset using the first set of neural network cells, wherein:

the third update subset is associated with a third session; and determining the first vector set comprises providing, as model inputs, the third vector and a difference between a second session of the set of sessions and the third session of the set of sessions to the second set of neural network cells.

7. The method of claim 4, further comprising segmenting a set of updates associated with the record into a set of update subsets, wherein inputting the respective periodic function output comprises:

generating a periodic function result of a periodic function based on a timestamp of an update of a first update subset of the set of update subsets; and providing the third set of neural network cells with the periodic function result of the periodic function to determine the second vector set.

8. The method of claim 7, wherein the periodic function comprises a trigonometric function.

9. The method of claim 4, wherein the time difference is less than 24 hours.

10. The method of claim 4, further comprising:

segmenting a set of updates associated with the record into a set of update subsets; and determining a first session associated with a first update subset of the set of update subsets based on a first timestamp indicating a time that a connection of the first session was established and a second timestamp indicating a time that the connection of the first session was ended.

11. The method of claim 4, further comprising:

determining a learning model output by providing the record-characterizing vector to a first machine learning model;

determining whether the learning model output satisfies a threshold; and based on a determination that the learning model output satisfies the threshold, select a category value from a set of category values to assign to record mapped to by the record-characterizing vector.

12. The method of claim 4, wherein the periodic time interval is a first periodic time interval, and wherein the respective periodic interval segment is a first respective periodic interval segment, further comprising:

segmenting a set of updates associated with the record into a set of update subsets;

obtaining a second periodic time interval from a client computer device;

obtaining a second time interval segment from the client computer device;

determining a ratio based on the second periodic time interval, the second time interval segment, and a timestamp of an update of a first update subset of the set of update subsets, wherein the timestamp is within the first periodic time interval; and determining a third output using a fifth set of neural network cells based on the ratio, wherein generating the record-characterizing vector comprises generating the record-characterizing vector using the fourth set of neural network cells based on the third output.

13. One or more tangible, non-transitory machine-readable media storing instructions that, when executed by one or more processors, effectuate operations comprising:

inputting a set of update subsets into a first machine learning model;

for each respective vector of a set of vectors derived from output of the first machine learning model in connection with inputting the set of update subsets into the first machine learning model, inputting (1) the respective vector and a time difference between sessions of a set of sessions into a second machine learning model and (2) a respective periodic function output derived from a respective periodic interval segment of a periodic time interval into a third machine learning model;

inputting a first vector set and a second vector set into a fourth machine learning model, the first vector set being derived from output of the second machine learning model in connection with inputting the respective vectors and the time difference into the second machine learning model, the second vector set being derived from output of the third machine learning model in connection with inputting the respective vectors and the respective periodic function outputs into the third machine learning model; and pre-pushing data or computing resources based on one or more predicted user actions that correspond to a set of values derived from output of the fourth machine learning model in connection with inputting the first vector set and the second vector set into the fourth machine learning model.

14. The one or more tangible, non-transitory machine-readable media of claim 13, wherein:

the second machine learning model comprises a transformer neural network; and generating the first vector set comprises: determining a set of attention values using the transformer neural network based on the set of vectors, wherein each respective attention value of the set of attention values is associated with a respective candidate vector of the set of vectors; and generating at least one vector of the first vector set based on the set of attention values.

15. The one or more tangible, non-transitory machine-readable media of claim 13, wherein the set of update subsets is a first set of update subsets, the operations further comprising:

segmenting a set of updates associated with a record into the first set of update subsets; and training the third machine learning model by:

predicting a subsequent set of values based on a second set of outputs using the third machine learning model;

obtaining a second set of update subsets, wherein the second set of update subsets comprises at least one update subset of the first set of update subsets and an additional update subset associated with a new session;

generating a second set of values based on the second set of update subsets;

generating a third set of values based on a third set of outputs using the third machine learning model;

determining a cosine distance between the subsequent set of values and the set of values; and updating model parameters of the third machine learning model based on the cosine distance.

16. The one or more tangible, non-transitory machine-readable media of claim 13, wherein the set of update subsets comprises values identifying clickstream events.

17. The one or more tangible, non-transitory machine-readable media of claim 13, the operations further comprising:

segmenting a set of updates associated with a record into the set of update subsets;

determining that a digital session was established; and obtaining the record associated with the set of update subsets based on identifiers of the digital session.

18. The one or more tangible, non-transitory machine-readable media of claim 13, the operations further comprising:

segmenting a set of updates associated with a record into the set of update subsets;

obtaining a web request addressed to a uniform resource locator comprising a request for a resource or a change to a value of the record associated with the set of update subsets;

mapping the uniform resource locator to an action type category based on a stored set of action type categories; and adding the action type category to the set of updates.

19. The one or more tangible, non-transitory machine-readable media of claim 13, wherein the third machine learning model comprises a fully connected neural network layer.

20. The one or more tangible, non-transitory machine-readable media of claim 13, wherein the periodic time interval is a first periodic time interval, and wherein the second vector set is a first periodic vector set that is characterized by the first periodic time interval, the operations further comprising:

for each respective vector of the set of vectors, determining a respective second periodic vector of a second periodic vector set using a fifth machine learning model based on a respective second periodic function output determined based on a respective second periodic interval segment of a second periodic time interval; and obtaining (1) a first prediction that a first action occurs at a first time determined by the first periodic time interval and (2) a second prediction that a second action occurs at a second time determined by the second periodic time interval, wherein pre-pushing the data or the computing resources comprises pre-pushing the data or the computing resources before (1) the first time based on the first prediction and (2) the second time based on the second prediction.

\* \* \* \* \*